US011719306B2

(12) United States Patent
Furukawa et al.

(10) Patent No.: US 11,719,306 B2
(45) Date of Patent: Aug. 8, 2023

(54) DAMPING DEVICE

(71) Applicant: Panasonic Intellectual Property Management Co., Ltd., Osaka (JP)

(72) Inventors: Akira Furukawa, Osaka (JP); Hiroshi Fujiwara, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 423 days.

(21) Appl. No.: 17/057,806

(22) PCT Filed: Jun. 5, 2019

(86) PCT No.: PCT/JP2019/022283
§ 371 (c)(1),
(2) Date: Nov. 23, 2020

(87) PCT Pub. No.: WO2020/044703
PCT Pub. Date: Mar. 5, 2020

(65) Prior Publication Data
US 2021/0199175 A1 Jul. 1, 2021

(30) Foreign Application Priority Data
Aug. 31, 2018 (JP) ................................ 2018-163233

(51) Int. Cl.
*F16F 15/02* (2006.01)
*B23Q 11/00* (2006.01)
*F16F 7/10* (2006.01)
(52) U.S. Cl.
CPC .......... *F16F 15/02* (2013.01); *B23Q 11/0032* (2013.01); *F16F 7/1005* (2013.01)
(58) Field of Classification Search
CPC ...... F16F 7/1005; F16F 15/02; B23Q 11/0032
See application file for complete search history.

(56) References Cited

U.S. PATENT DOCUMENTS 7,063,192 B2\* 6/2006 Mayama ............... F16F 7/1005
267/136
8,138,693 B2\* 3/2012 Terada ................... G05D 19/02
318/702
(Continued)

FOREIGN PATENT DOCUMENTS

JP 2002-221249 A 8/2002
JP 2003-181739 A 7/2003
(Continued)

OTHER PUBLICATIONS

International Search Report w/English translation and Written Opinion in Japanese dated Jul. 23, 2019, issued in counterpart International Application No. PCT/JP2019/022283 (7 pages).

*Primary Examiner* — Thomas W Irvin
(74) *Attorney, Agent, or Firm* — WHDA, LLP

(57) ABSTRACT

A damping device includes: a housing; a drive-side actuator that includes a drive-side stator and a drive-side mover and is connected to the housing; a damping-side actuator that includes a damping-side stator and a damping-side mover and is connected to the housing; a first signal calculator that generates a drive signal for the drive-side actuator based on a control command; and a second signal calculator that generates, when the drive-side actuator changes from a large to a small jerk state, a drive signal for the damping-side actuator based on a signal obtained by subtracting a displacement suppression command suppressing a displacement of the damping-side mover from a vibration suppression command reducing or offsetting, by a vibration component of the housing produced by driving of the damping-side actuator, a natural frequency component of the housing produced by driving of the drive-side actuator based on the control command.

13 Claims, 24 Drawing Sheets

(56) References Cited

U.S. PATENT DOCUMENTS

| | | | |
|---|---|---|---|
| 10,184,539 B2* | 1/2019 | Kraner | F16F 7/1011 |
| 11,512,757 B2* | 11/2022 | Kordunsky | F16F 15/022 |
| 2002/0104950 A1* | 8/2002 | Mayama | F16F 7/1005 |
| | | | 414/935 |
| 2010/0030384 A1* | 2/2010 | Kraner | F16F 15/02 |
| | | | 188/380 |
| 2010/0060220 A1 | 3/2010 | Terada et al. | |
| 2011/0127400 A1* | 6/2011 | Kastelijn | F16F 15/03 |
| | | | 248/550 |
| 2021/0246962 A1* | 8/2021 | Furukawa | F16F 7/1005 |
| 2022/0112934 A1* | 4/2022 | Phillips | F16F 7/1005 |
| 2022/0170767 A1* | 6/2022 | Blumm | F16F 15/02 |

FOREIGN PATENT DOCUMENTS

| | | |
|---|---|---|
| JP | 2011-124292 A | 6/2011 |
| JP | 4869353 B2 | 2/2012 |
| WO | 2008/066035 A1 | 6/2008 |

\* cited by examiner

# DAMPING DEVICE

TECHNICAL FIELD

The present invention relates to a damping device that controls an actuator connected to a housing to suppress vibration of the housing.

BACKGROUND ART

Nowadays, various devices, such as semiconductor manufacturing devices, machine tools, and conveying devices use actuators whose movements are controlled by controllers to move objects such as workpieces and products in a predetermined direction. To produce more products in a short time, there is a demand to reduce the time required to move workpieces as much as possible. A movable part of an actuator need be moved at high speed to meet such a demand and the reaction force (excitation force) acting on the machine increases as the acceleration during operation increases. In particular, linear motors with large acceleration have large thrust during operation, which increases the excitation force during acceleration and deceleration when objects are moved. This can lead to problems, such as the accuracy of the relative position between the workpiece and the device deteriorates, and other devices vibrate as vibrations are transmitted to the floor where the device is placed.

In order to solve these problems, a conventional machining apparatus places a weight driving device on a support device. A controller drives the placed weight driving device to suppress the vibration caused by the movement of the horizontal moving part in the machining apparatus (for example, see Patent Literature (PTL) 1).

CITATION LIST

Patent Literature

PTL 1: Japanese Unexamined Patent Application Publication No. 2003-181739

SUMMARY OF THE INVENTION

Technical Problems

However, the conventional technique has the following problems.

The machining apparatus described in PTL 1 operates AC motor 11b so that the phase of the inertial force due to weight 18 is opposite to the phase of the moment force due to the horizontal excitation force during the movement of X table 7, based on the current command signal or the voltage command signal output to motor 11a. When X table 7 is moved to the right, the reaction force of the thrust for moving X table 7 causes leftward force acting on bed 6. On the other hand, when weight 18 is moved to the left, the reaction force of the thrust for moving weight 18 causes rightward force acting on bed 6. As a result, the force acting on bed 6 is offset to suppress the occurrence of the vibration, but it is difficult to completely offset when the machining apparatus is desired to be made smaller and lighter.

When the mass of weight 18 is reduced, the acceleration needs to be increased to achieve substantially the same thrust. When the acceleration is increased, the speed and the displacement naturally increase. Consequently, the size of the machining apparatus increases. Moreover, when the maximum displacement of weight 18 is reduced, the mass needs to be increased to achieve substantially the same thrust. When the mass is increased, the strength of the component supporting weight 18 needs to be increased. Consequently, the weight of the machining apparatus increases.

The present invention has been conceived to address the above problems and aims to provide a damping device that reduces or offsets, by one or more vibration components produced by driving of a damping-side actuator, one or more vibration components produced in the housing by driving of a drive-side actuator, and also reduces one-sided displacement of the damping-side actuator.

Solution to Problems

A damping device according to the present invention includes: a housing; a drive-side actuator that includes a drive-side stator and a drive-side mover and is connected to the housing; a damping-side actuator that includes a damping-side stator and a damping-side mover and is connected to the housing; a first signal calculator that generates a drive signal for the drive-side actuator based on a control command; and a second signal calculator that generates, when the drive-side actuator changes from a state in which jerk is large to a state in which the jerk is small, a drive signal for the damping-side actuator based on a signal obtained by subtracting a displacement suppression command from a vibration suppression command, the displacement suppression command being a command to suppress a displacement of the damping-side mover, the vibration suppression command being a command to reduce or offset, by a vibration component of the housing produced by driving of the damping-side actuator, a natural frequency component of the housing produced by driving of the drive-side actuator based on the control command.

Advantageous Effects of Invention

With the damping device according to the present invention, one or more natural frequency components of the housing produced by driving of the drive-side actuator can be reduced or offset by one or more vibration components of the housing produced by driving of the damping-side actuator by generating the drive signal for the drive-side actuator and the drive signal for the damping-side actuator based on the control command.

DESCRIPTION OF EXEMPLARY EMBODIMENT

Embodiment

Figure 1:
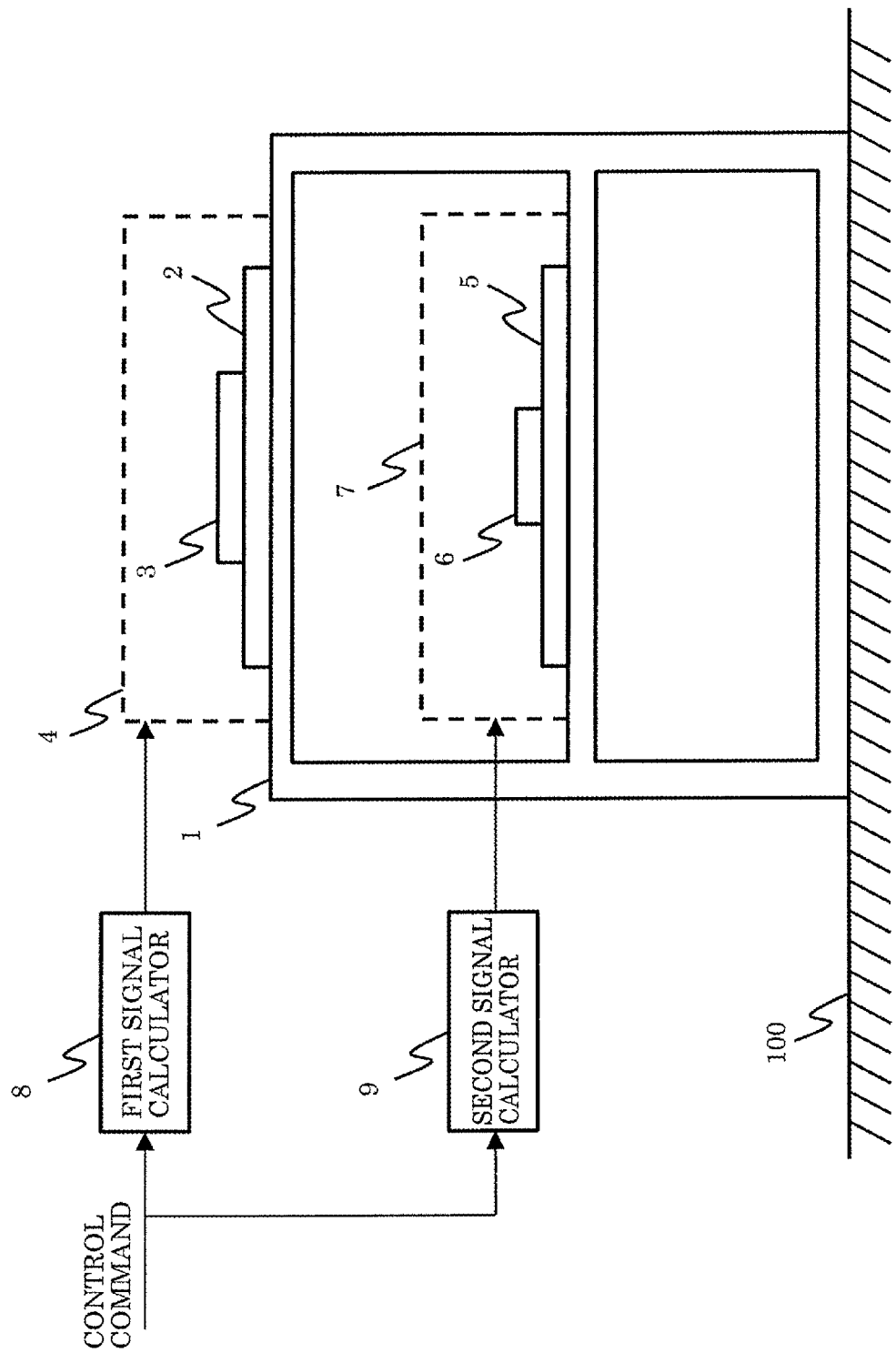
FIG. 1 is a schematic diagram of an exemplary configuration of a damping device according to an embodiment of the present invention.

FIG. 1 is a schematic diagram of a whole configuration of a damping device according to an embodiment of the present invention.

Figure 2:
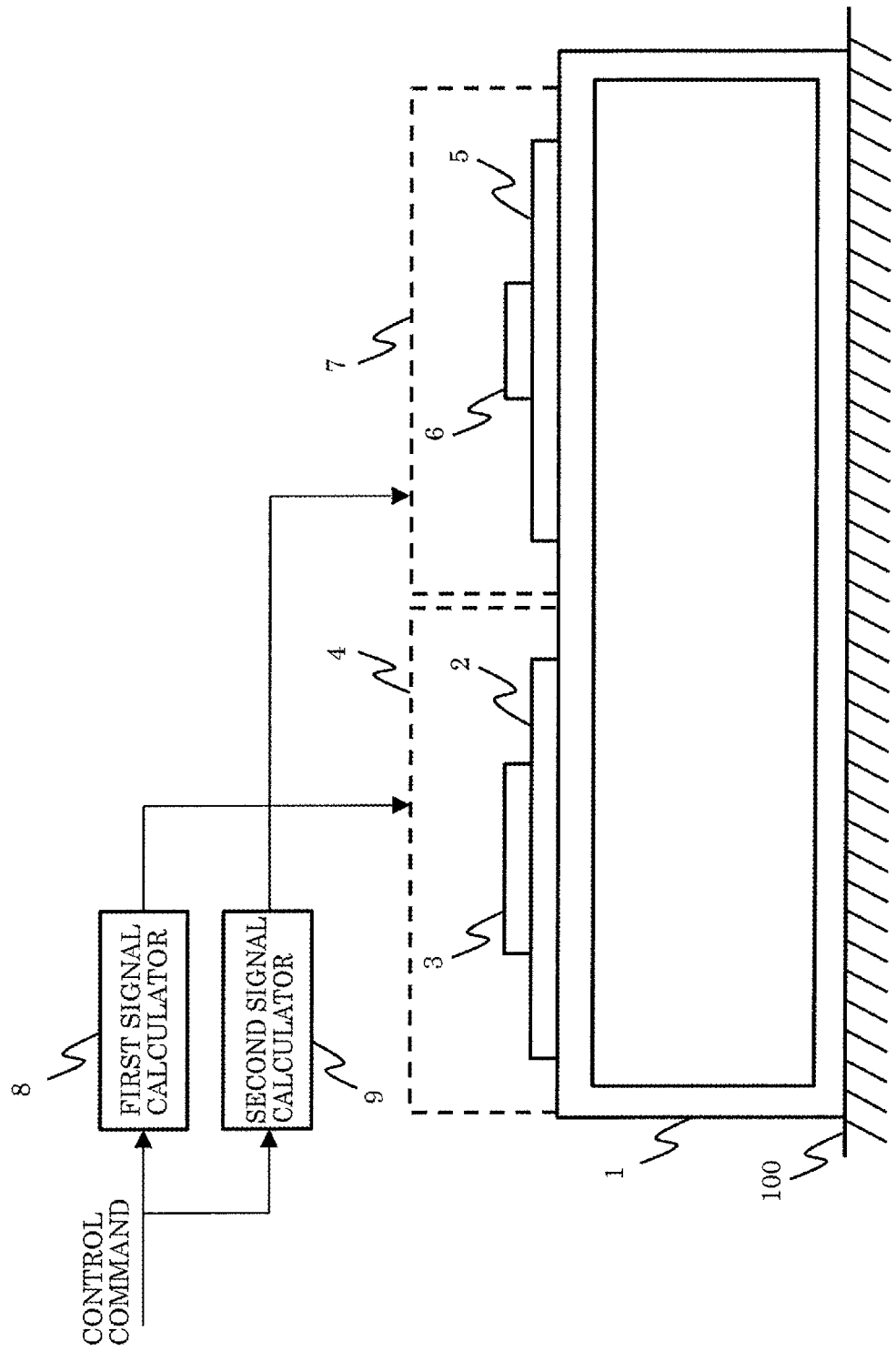
FIG. 2 is a schematic diagram of another exemplary configuration of the damping device according to the embodiment of the present invention.
Figure 3:
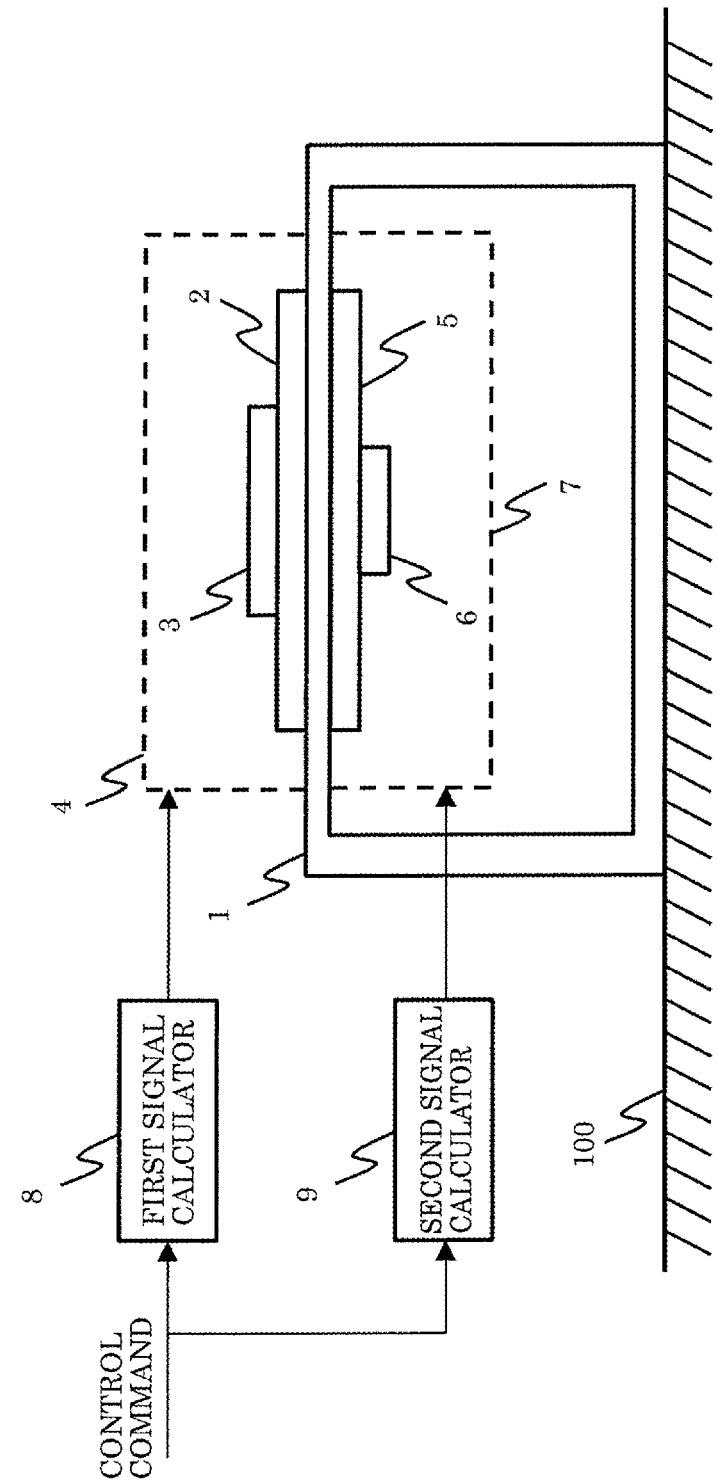
FIG. 3 is a schematic diagram of another exemplary configuration of the damping device according to the embodiment of the present invention.

In FIG. 1, the damping device includes housing 1, drive-side actuator 4, damping-side actuator 7, first signal calculator 8, and second signal calculator 9. The damping device is placed on floor 100. In FIG. 1, drive-side actuator 4 and damping-side actuator 7 are located on different planes, but damping-side actuator 7 may be placed in a space where damping-side actuator 7 can be placed when drive-side actuator 4 is placed in the damping device. For example, drive-side actuator 4 and damping-side actuator 7 may be placed on the same plane as illustrated in FIG. 2 or on both sides of a plane of the housing as illustrated in FIG. 3.

Here, the case where a control command is a speed command will be described. Since a position is obtained by integrating the speed, there is no need to say that a similar concept can be applied to a position command.

Drive-side actuator 4 includes drive-side stator 2 and drive-side mover 3, and is driven in accordance with the drive signal for the drive-side actuator generated by first signal calculator 8. Examples of drive-side actuator 4 include a ball-screw mechanism that connects the output shaft of the servo motor to the screw shaft, and a linear motor when high-speed and high-positioning accuracy is required.

Damping-side actuator 7 includes damping-side stator 5 and damping-side mover 6, and is driven in accordance with the drive signal for the damping-side actuator generated by second signal calculator 9. Examples of damping-side actuator 7 include a ball-screw mechanism and a linear motor.

Figure 4:
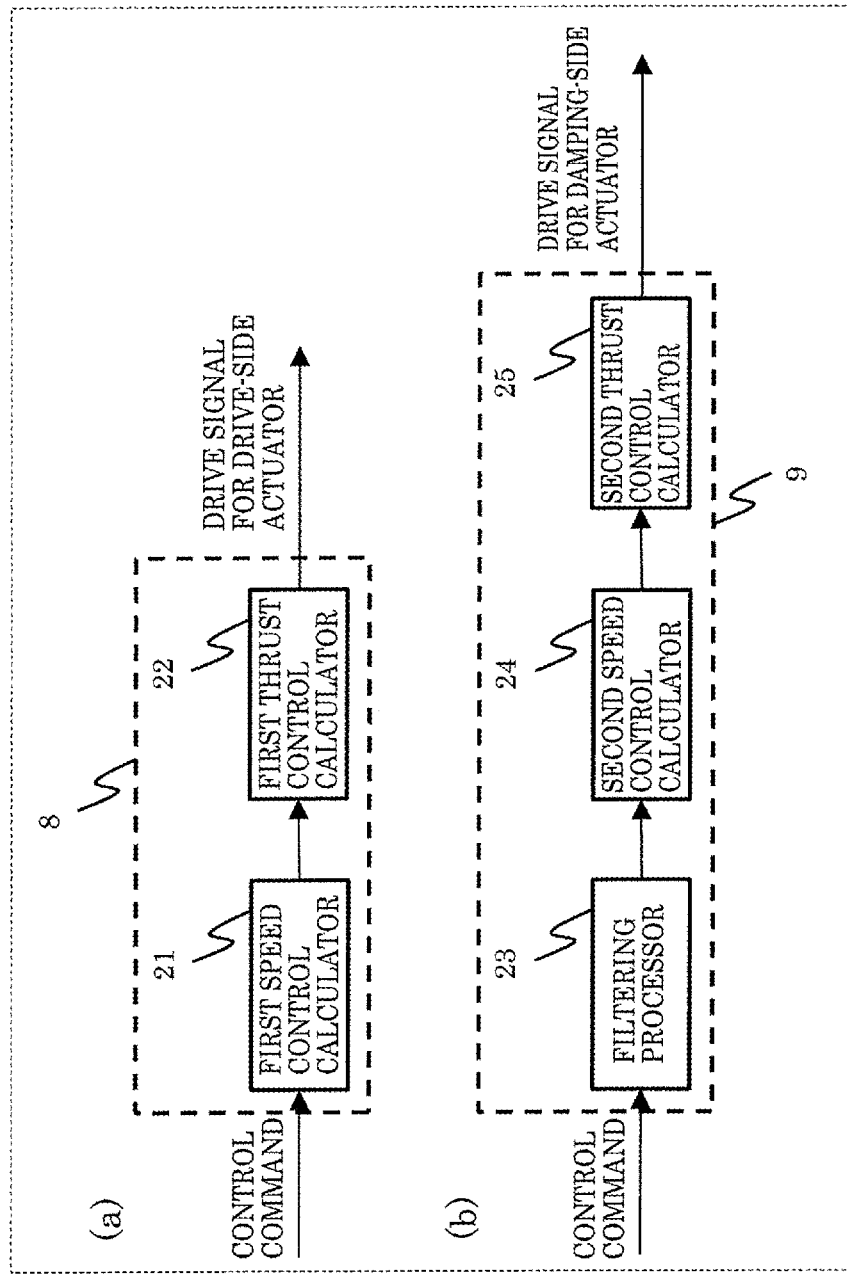
FIG. 4 is a block diagram of a first signal calculator and a second signal calculator of the damping device according to the embodiment of the present invention.

FIG. 4 illustrates an exemplary configuration of first signal calculator 8 in (a), and an exemplary configuration of second signal calculator 9 in (b).

First signal calculator 8 includes first speed control calculator 21 and first thrust control calculator 22. First speed control calculator 21 calculates a thrust command by a known method, for example, two-degree-of-freedom control or feedback control so that the thrust command can follow the control command (speed command) that is input. First thrust control calculator 22 outputs a drive signal for the drive-side actuator calculated by a known method, for example, two-degree-of-freedom control or feedback control so that the drive signal can follow the thrust command calculated by first speed control calculator 21. Here, a thrust command is used because this embodiment is described using a linear motion system as a control target. However, a command such as a current command or a torque command may be used if it is suitable for the control target.

Second signal calculator 9 includes filtering processor 23, second speed control calculator 24, and second thrust control calculator 25. Filtering processor 23 performs filtering described below on the control command and outputs a filtered control command. Second speed control calculator 24 calculates a thrust command by a known method, for example, two-degree-of-freedom control or feedback control so that the thrust command can follow the filtered control command that is input. Second thrust control calculator 25 outputs a drive signal for the damping-side actuator calculated by a known method, for example, two-degree-of-freedom control or feedback control so that the drive signal can follow the thrust command calculated by second speed control calculator 24. Here, a thrust command is used because this embodiment is described using a linear motion system as a control target. However, a command such as a current command or a torque command may be used if it is suitable for the control target.

Figure 5:
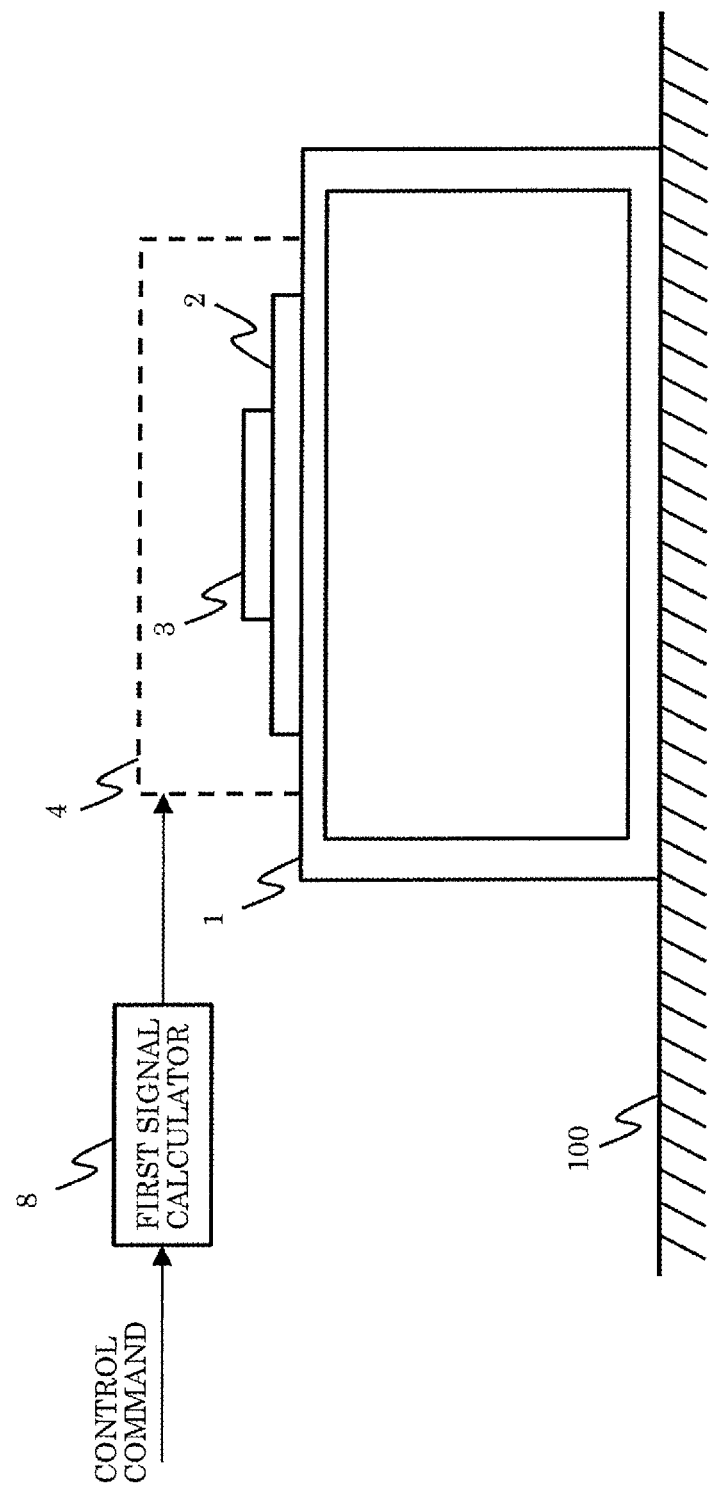
FIG. 5 is a schematic diagram of an exemplary configuration of a conventional device that includes a housing and a drive-side actuator and does not include a damping-side actuator.
Figure 6:
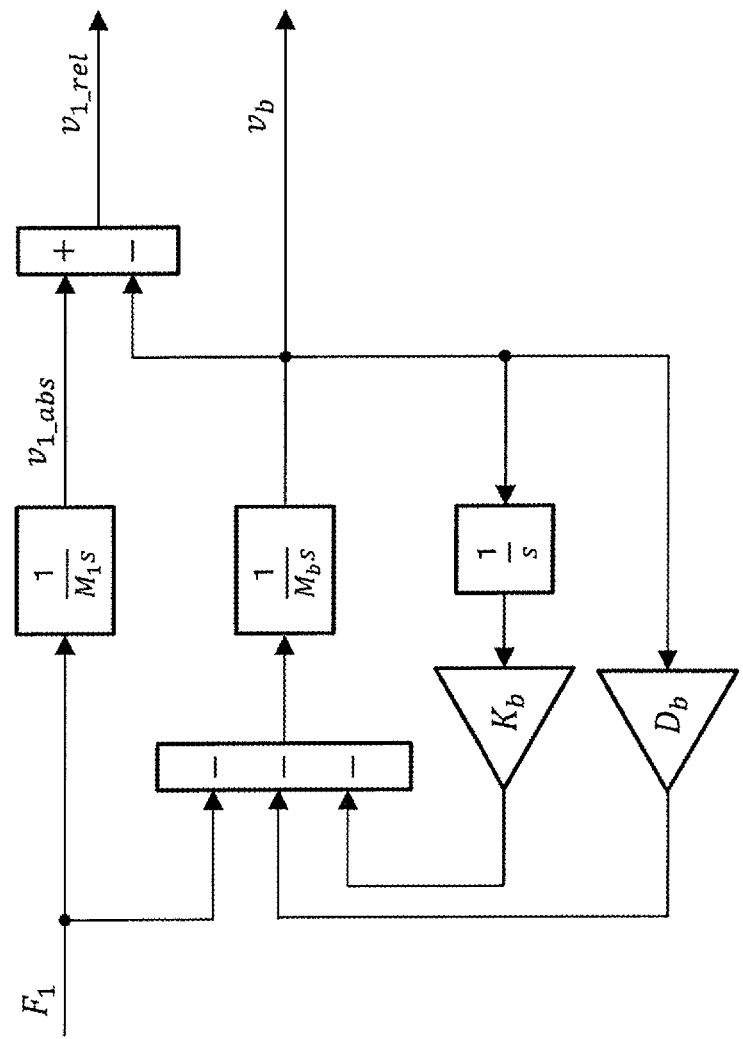
FIG. 6 is a block diagram that simply illustrates a control target in the conventional device that includes the housing and the drive-side actuator and does not include the damping-side actuator.

The operations of a device that includes housing 1 and drive-side actuator 4 and does not include damping-side actuator 7 as illustrated in FIG. 5 are described first. A simple block diagram of this device is illustrated in FIG. 6. M1 represents the mass of the drive-side mover, Mb represents the mass of housing 1, Kb represents the stiffness of housing 1, and Db represents the viscosity of housing 1. Here, the inertial force is the only force acting on the drive-side mover, but the same concept can be applied even when there is a friction force, because it is a frequency component lower than one or more natural frequency components of the housing that are focused in the present invention.

Thrust F1 produced in drive-side actuator 4 acts on drive-side mover 3, and absolute speed v1_abs of drive-side mover 3 is given by expression (1).

[Math. 1]

$$v_{1\_abs} = \frac{1}{M_1 s} F_1 \tag{1}$$

On the other hand, the reaction force of thrust F1 comes into housing 1 via drive-side stator 2, and thus speed vb and acceleration ab of housing 1 are given by expression (2). In other words, resonance frequency ωb of the control target is a natural frequency of housing 1, as in expression (3).

[Math. 2]

$$\begin{cases} v_b = -\dfrac{s}{M_b s^2 + D_b s + K_b} F_1 \\ a_b = -\dfrac{s^2}{M_b s^2 + D_b s + K_b} F_1 \end{cases} \tag{2}$$

[Math. 3]

$$\omega_b = \sqrt{\frac{K_b}{M_b}} \tag{3}$$

Drive-side actuator 4 operates starting from a standstill state, accelerates and decelerates, and returns to the standstill state. When the time period from the standstill state to a next standstill state is denoted as T, the thrust produced in such a time period can be expressed as expression (4).

[Math. 4]

$$F_1 = \sum_{k=1}^{\infty} \left( F_{1sk} \sin\frac{2\pi kt}{T} + F_{1ck} \cos\frac{2\pi kt}{T} \right) \tag{4}$$

Expression (4) is a time domain expression. Therefore, when expression (4) is Laplace transformed and rewritten as an expression in the s-domain, expression (5) is given.

[Math. 5]

$$F_1 = \sum_{k=1}^{\infty} \left( F_{1sk} \frac{2\pi kT}{T^2 s^2 + (2\pi k)^2} + F_{1ck} \frac{T^2 s}{T^2 s^2 + (2\pi k)^2} \right) \tag{5}$$

Substituting expression (5) into expression (2) yields expression (6).

[Math. 6]

$$\begin{cases} v_b = -\dfrac{s}{M_b s^2 + D_b s + K_b} \sum_{k=1}^{\infty} \left( F_{1sk} \dfrac{2\pi kT}{T^2 s^2 + (2\pi k)^2} + F_{1ck} \dfrac{T^2 s}{T^2 s^2 + (2\pi k)^2} \right) \\ a_b = -\dfrac{s^2}{M_b s^2 + D_b s + K_b} \sum_{k=1}^{\infty} \left( F_{1sk} \dfrac{2\pi kT}{T^2 s^2 + (2\pi k)^2} + F_{1ck} \dfrac{T^2 s}{T^2 s^2 + (2\pi k)^2} \right) \end{cases} \tag{6}$$

The amplitude of the fundamental wave component in one or more signals contained in thrust F1 is generally larger than the amplitudes of other frequency components. Therefore, thrust F1 is simplified as expression (7).

[Math. 7]

$$F_1 \cong F_{1s} \frac{2\pi T}{T^2 s^2 + (2\pi)^2} \tag{7}$$

In this case, acceleration ab of housing 1 is given by expression (8). It can be understood that acceleration ab of housing 1 is a value obtained by superposing one or more components of resonance frequency ωb on one or more frequency components contained in the thrust.

[Math. 8]

$$a_b = -\frac{s^2}{M_b s^2 + D_b s + K_b} \frac{2\pi T}{T^2 s^2 + (2\pi)^2} F_{1s} \tag{8}$$

Figure 7:
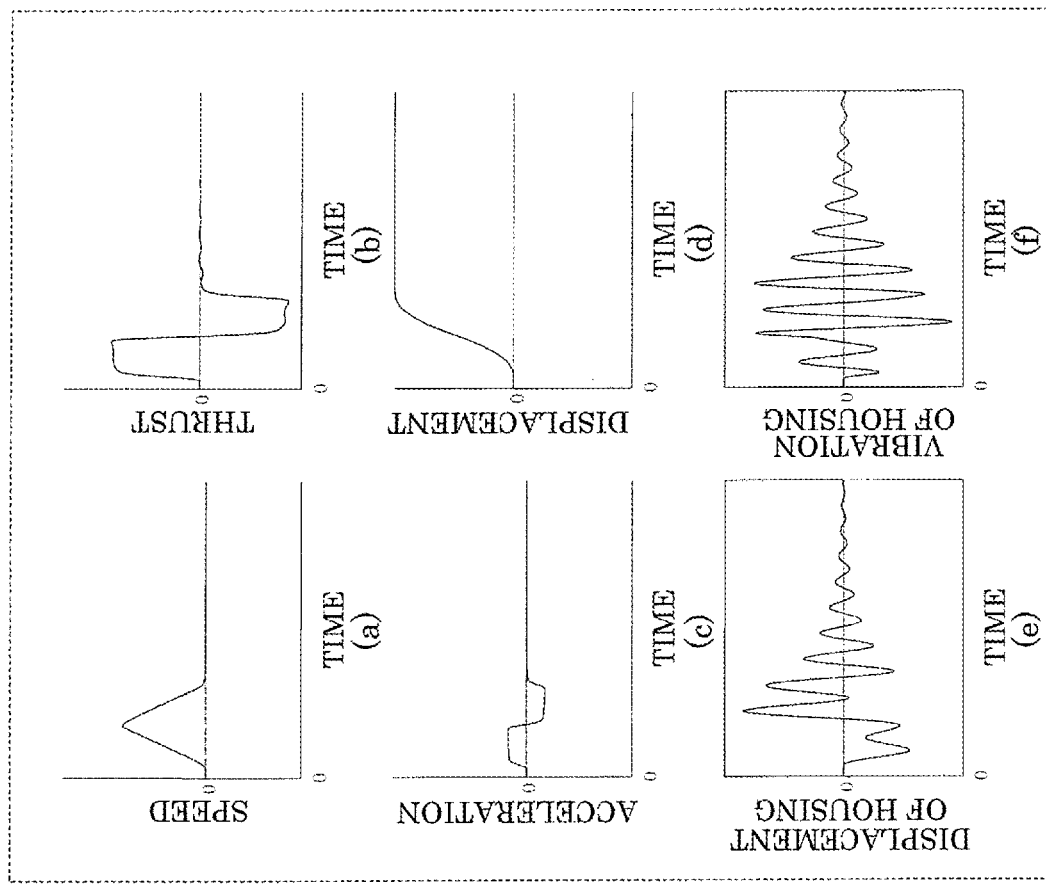
FIG. 7 shows time-series waveforms when a control command is input to the conventional device that includes the housing and the drive-side actuator and does not include the damping-side actuator.

FIG. 7 shows time series waveforms when a control command is input to the device in FIG. 6. In FIG. 7, (a) shows relative speed v1_rel of the drive-side actuator with respect to housing 1, (b) shows thrust F1 of the drive-side actuator, (c) shows relative acceleration a1_rel of the drive-side actuator with respect to housing 1, (d) shows relative displacement x1_rel of the drive-side actuator with respect to housing 1, (e) shows displacement xb of housing 1, and (f) shows acceleration (vibration) ab of housing 1. Starting at a time when the thrust changes significantly, housing 1 vibrates in a vibration waveform obtained by superposing the one or more natural frequency components of housing 1 on a signal having an opposite phase with respect to the thrust.

Figure 8:
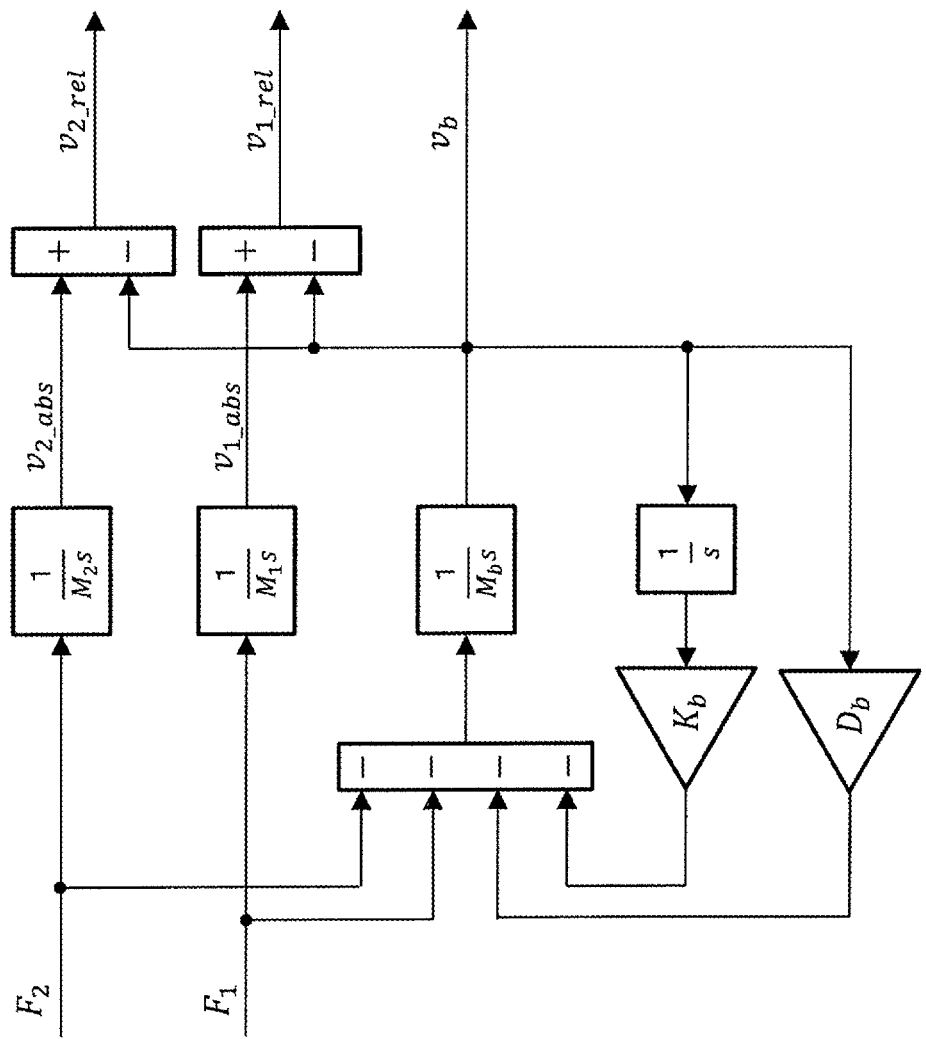
FIG. 8 is a block diagram that simply illustrates a control target in the damping device according to the embodiment of the present invention.

Next, how vibration can be suppressed in the damping device according to the present embodiment illustrated in the block diagram of FIG. 8 will be described. M2 represents the mass of the damping-side mover.

Thrust F1 produced in drive-side actuator 4 acts on drive-side mover 3, and absolute speed v1_abs of drive-side mover 3 is given by expression (1).

Thrust F2 produced in damping-side actuator 7 acts on damping-side mover 6, and absolute speed v2_abs of damping-side mover 6 is given by expression (9).

[Math. 9]

$$v_{2\_abs} = \frac{1}{M_2 s} F_2 \quad (9)$$

On the other hand, the reaction force of thrust F1 comes into housing 1 via drive-side stator 2, the reaction force of thrust F2 comes into housing 1 via damping-side stator 5. Thus, speed vb and acceleration ab of housing 1 are given by expression (10).

[Math. 10]

$$\begin{cases} v_b = -\dfrac{s}{M_b s^2 + D_b s + K_b}(F_1 + F_2) \\ a_b = -\dfrac{s^2}{M_b s^2 + D_b s + K_b}(F_1 + F_2) \end{cases} \quad (10)$$

The following describes how to apply thrust F2 to reduce or offset the one or more natural frequency components produced by the reaction force of thrust F1. Thrust F1 and thrust F2 are produced due to the one or more drive signals obtained from the control command, and therefore the relational expression between thrust F1 and thrust F2 is expressed as expression (11).

[Math. 11]

$$F_2 = G(s)F_1 \quad (11)$$

Substituting expression (11) into expression (10) yields expression (12).

[Math. 12]

$$a_b = -\frac{s^2}{M_b s^2 + D_b s + k_b}(1 + G(s))F_1 \quad (12)$$

In order to reduce the one or more natural frequency components in expression (3) with 1+G(s), a band-stop filter as expressed as expression (13) that blocks one or more resonance frequencies may be used, for example. Here, ωb represents the central frequency of the stop band, ζ represents the width of the stop band, and d represents the depth of the stop band. When center frequency ωb is a resonance frequency of housing 1, which is the mechanical constant of the damping device, a filter can be used to block the one or more natural frequency components.

[Math. 13]

$$1 + G(s) = \frac{s^2 + 2d\zeta\omega_b s + \omega_b^2}{s^2 + 2\zeta\omega_b s + \omega_b^2} \quad (13)$$

Therefore, G(s) which satisfies expression (13) may be a band-pass filter whose passing frequency is ωb as expressed as expression (14), for example.

[Math. 14]

$$G(s) = -\frac{2(1-d)\zeta\omega_b s}{s^2 + 2\zeta\omega_b s + \omega_b^2} \quad (14)$$

Note that 1+G(s) is sufficient if it is a filter that can block one or more resonance frequencies. Therefore, the same effect can be obtained when G(s) is a filter obtained by combining a low-pass filter and a high-pass filter as expressed as expression (15), for example. Here, k1 and k2 are real numbers greater than 1.

[Math. 15]

$$G(s) = -\frac{k_1 \omega_b}{s + k_1 \omega_b} \frac{k_2 s}{k_2 s + \omega_b} \quad (15)$$

Thrust F2 of the damping-side actuator may be a value obtained by multiplying thrust F1 of the drive-side actuator by filter G(s) as in expression (14), for example.

Figure 9:
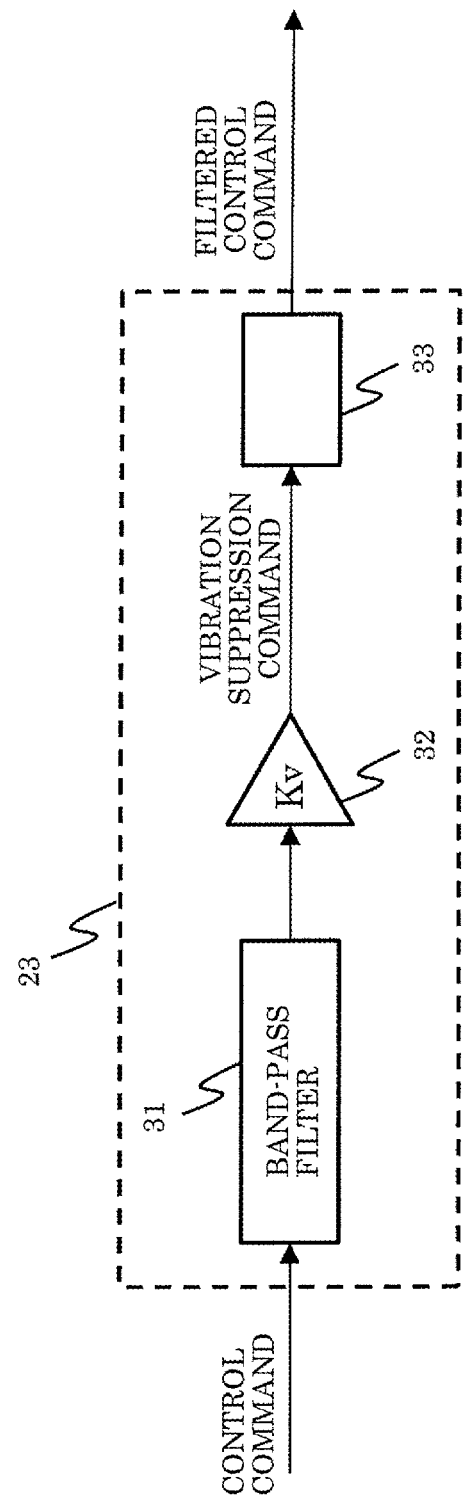
FIG. 9 is a diagram of an exemplary configuration of a filtering processor according to the embodiment of the present invention.

In other words, filtering processor 23 may be configured as shown in FIG. 9. Band-pass filter 31 performs filtering based on expression (14), and the signal output from band-pass filter 31 is multiplied by gain 32 to output a vibration suppression command. In response to the filtered control command generated based on the vibration suppression command including one or more desired frequency components, the drive signal for the damping-side actuator is output as shown in (b) in FIG. 4. With this, the one or more natural frequency components of the housing produced by thrust of the drive-side actuator can be reduced or offset by the one or more vibration components of the housing produced by driving of the damping-side actuator. This is an effect that has not been obtained conventionally.

Figure 10:
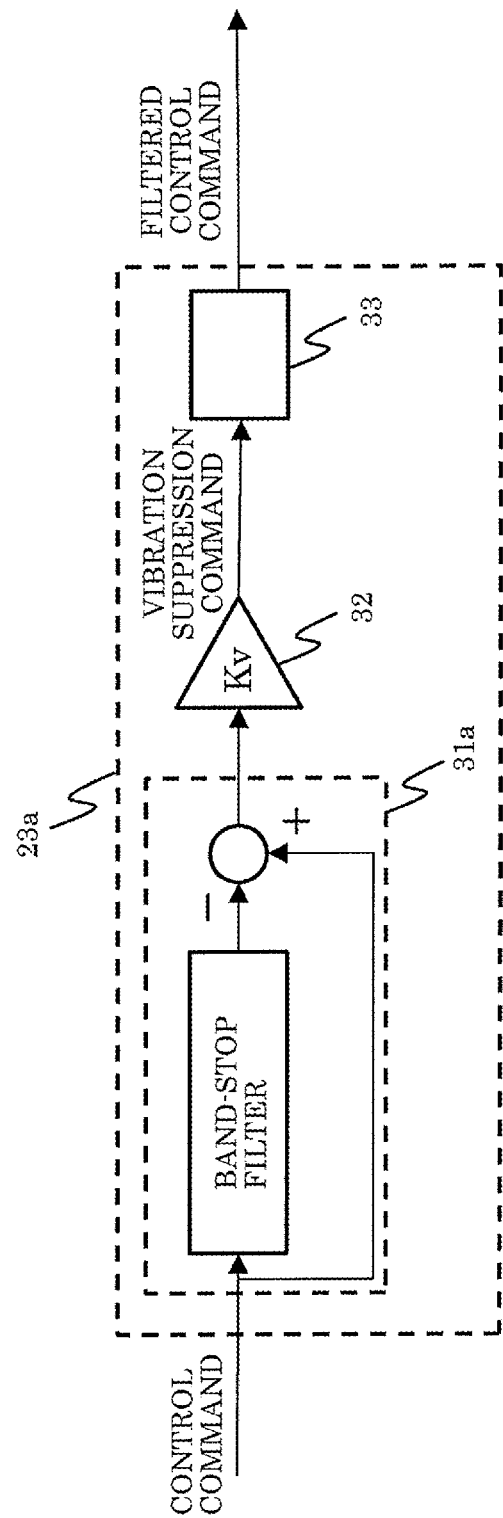
FIG. 10 is a diagram of another exemplary configuration of the filtering processor according to the embodiment of the present invention.

It goes without saying that the same effect can be obtained when band-pass filter 31 is implemented by subtracting the signal output from the band-stop filter from 1, as illustrated in FIG. 10. FIG. 9 illustrates a filtering processor including one band-pass filter, but it is also possible to include more than one filter. The same effect can be obtained with a filtering processor including a filter expressed as expression (15).

How gain 32 is determined will be described. Thrust is considered in expression (14) or expression (15), but in practice, the control command needs to be filtered. When the ratio of the mass of the drive-side mover to the mass of the damping-side mover is Km, the acceleration of the damping-side mover should be Km times the acceleration of the drive-side mover based on expression (1) and expression (9) to obtain the same thrust. In other words, gain 32 needs to be applied by expression (16) to achieve the filtering effect of expression (14) or expression (15).

[Math. 16]

$$K_v = K_m \quad (16)$$

The damping device according to the embodiment of the present invention aims to reduce or offset one or more natural frequency components of the housing due to driving of the drive-side actuator. Therefore, it is sufficient to suppress one or more natural frequency components of the housing included in the sum of the thrust of the drive-side actuator and the thrust of the drive-side actuator. The thrust is proportional to the product of the acceleration of the mover and the mass of the mover. Therefore, when the damping-side actuator is operated with a higher acceleration than the acceleration of the drive-side actuator, it is possible to suppress the natural vibration of the housing even when the mass of the damping-side mover is less than or equal to the mass of the drive-side mover. This is an effect that has not been obtained conventionally.

However, when gain 32 is set to a large value, the displacement of the damping-side mover increases. This may limit the location of the placement in the housing. In addition, due to the increased speed or acceleration, actuators that can be used as the damping-side actuator may be limited. Therefore, gain 32 may be set to a value as defined by expression (17), depending on the limitation of the placement in the housing and the limitation of the damping-side actuator.

[Math. 17]

$$K_v \leq K_m \tag{17}$$

Figure 11:
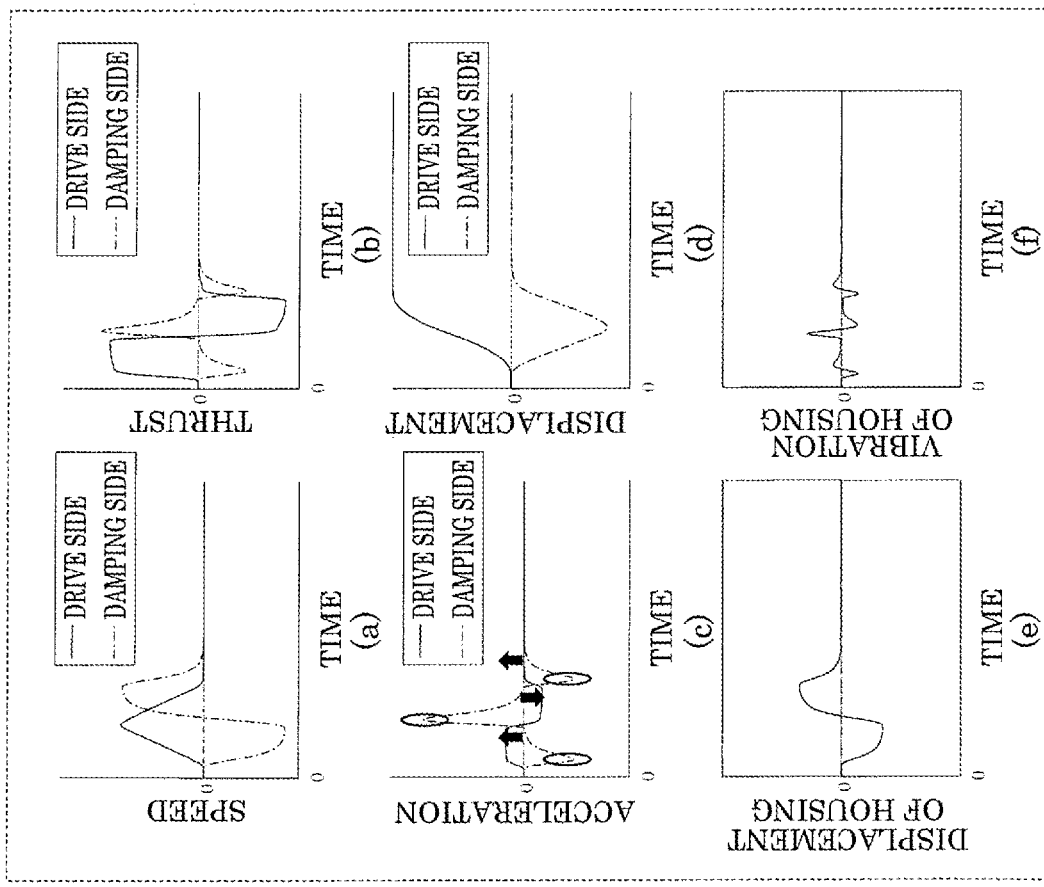
FIG. 11 shows time-series waveforms when a control command is input to the damping device according to the embodiment of the present invention when the damping device does not include a second filtering processor.

FIG. 11 shows time-series waveforms when a vibration suppression command is a filtered control command in the damping device according to the embodiment of the present invention. In (a) to (d) in FIG. 11, the solid lines indicate the movements of the drive-side actuator and the dashed lines indicate the movements of the damping-side actuator. In FIG. 11, (a) shows relative speed v1_rel of the drive-side actuator with respect to housing 1 and relative speed v2_rel of the damping-side actuator with respect to housing 1, (b) shows thrust F1 of the drive-side actuator and thrust F2 of the damping-side actuator, (c) shows relative acceleration a1_rel of the drive-side actuator with respect to housing 1 and relative acceleration a2_rel of the damping-side actuator with respect to housing 1, (d) shows relative displacement x1_rel of the drive-side actuator with respect to housing 1 and relative displacement x1_rel of the damping-side actuator with respect to housing 1, (e) shows displacement xb of housing 1, and (f) shows acceleration (vibration) ab of housing 1. Unlike the results shown in FIG. 7, in which vibration of one or more natural frequency components of housing 1 occurs, one or more vibration components are reduced.

Figure 12:
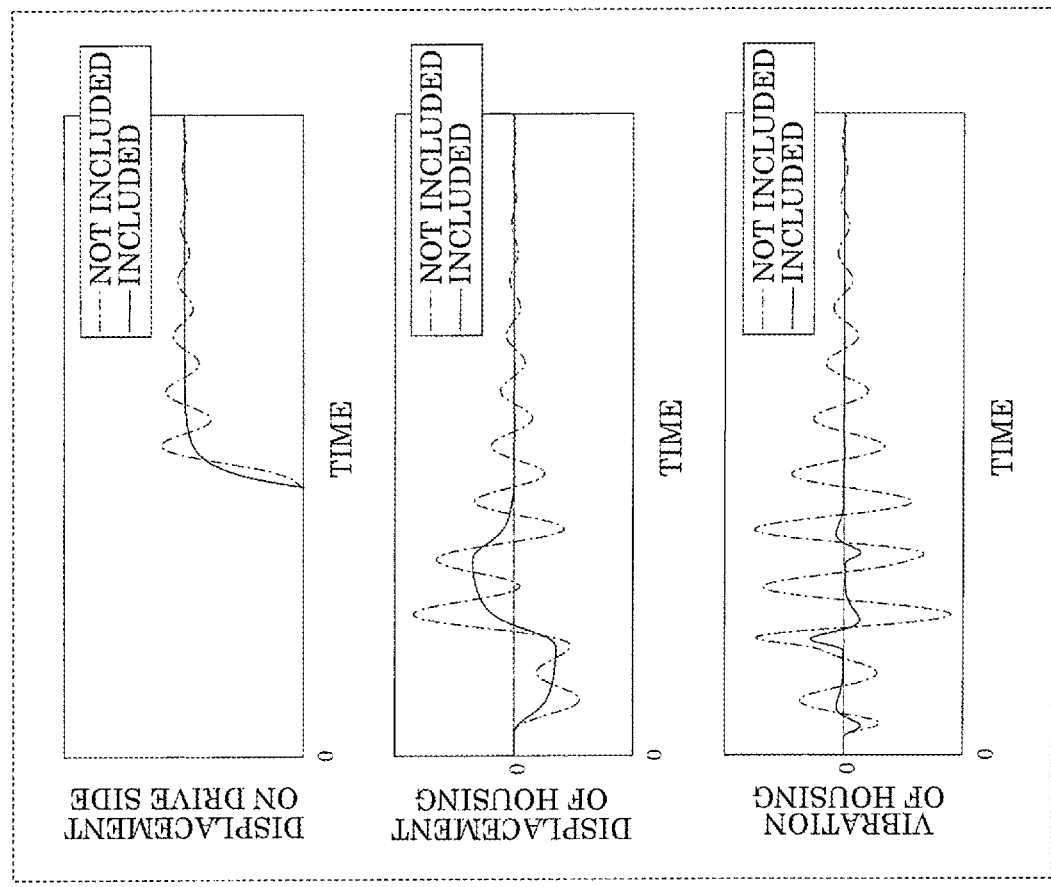
FIG. 12 shows comparisons of time-series waveforms between the conventional device and the damping device according to the embodiment of the present invention that does not include the second filtering processor when a control command is input to each of the conventional device and the damping device according to the embodiment of the present invention.

FIG. 12 shows comparisons between the time-series waveforms of the conventional device shown in FIG. 7 and the time series waveforms of the device shown in FIG. 11. The dashed lines indicate the waveforms of the conventional device, and the solid lines indicate the waveforms of the device shown in FIG. 11. The displacement on the drive side, which has been vibratory in the conventional device, is settled well in the device in FIG. 11. In addition, the vibration of the housing in which the one or more natural frequency components are observed in the conventional device can be reduced in the waveform of the device shown in FIG. 11.

In (d) in FIG. 11, the damping-side mover moves in the negative direction only. To suppress such one-sided amplitude of the displacement, the movement is desired to be in both directions. In (c) in FIG. 11, which shows the acceleration of the damping-side mover, the circled portions in which the jerk is large are necessary to suppress the vibration of the housing, but the acceleration in the portions pointed by arrows in which the jerk is small has a small effect on the suppression of the vibration and may be flexibly set. In other words, properly designing controller 33 in FIGS. 9 and 10 enables generation of a displacement suppression command to suppress the one-sided amplitude of the damping-side mover when the jerk is small.

Figure 13:
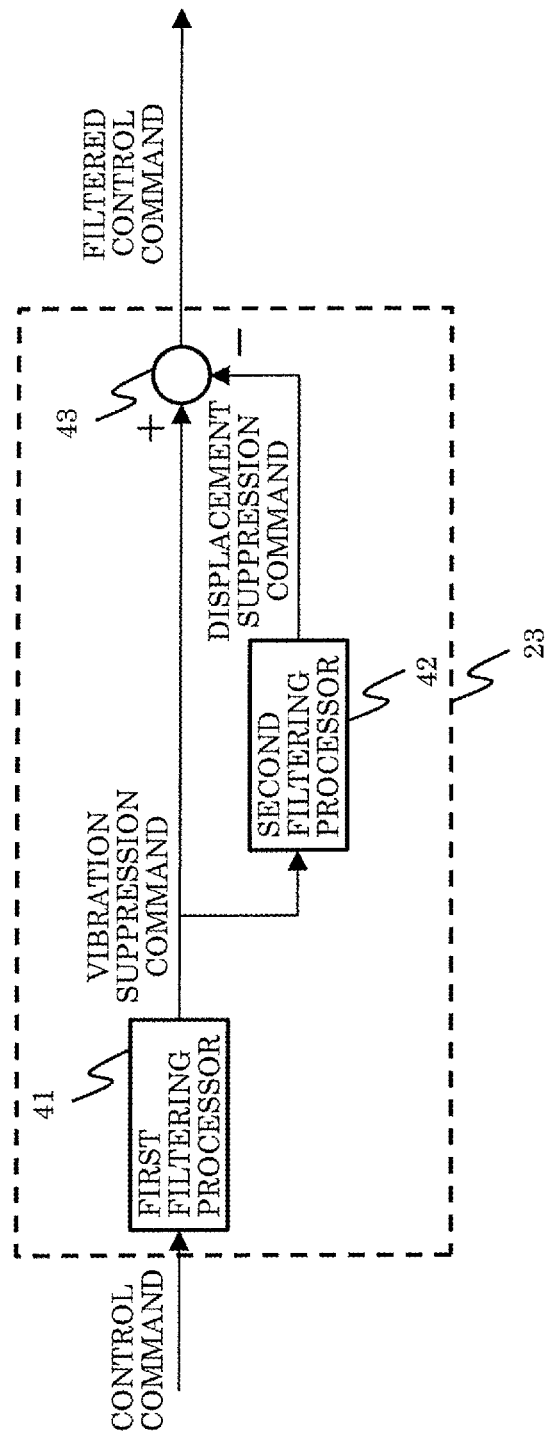
FIG. 13 is a diagram of an exemplary configuration of the filtering processor according to the embodiment of the present invention.

FIG. 13 illustrates filtering processor 23 of the damping device according to the embodiment of the present invention, taking into account the vibration suppression command for suppressing vibration of the housing and the displacement suppression command for suppressing the one-sided amplitude of the displacement of the damping-side mover. Filtering processor 23 includes first filtering processor 41, second filtering processor 42, and add-subtract processor 43. First filtering processor 41 outputs a vibration suppression command based on the control command. Second filtering processor 42 outputs a displacement suppression command based on the vibration suppression command. Add-subtract processor 43 outputs a filtered control command by subtracting the displacement suppression command from the vibration suppression command.

Figure 14:
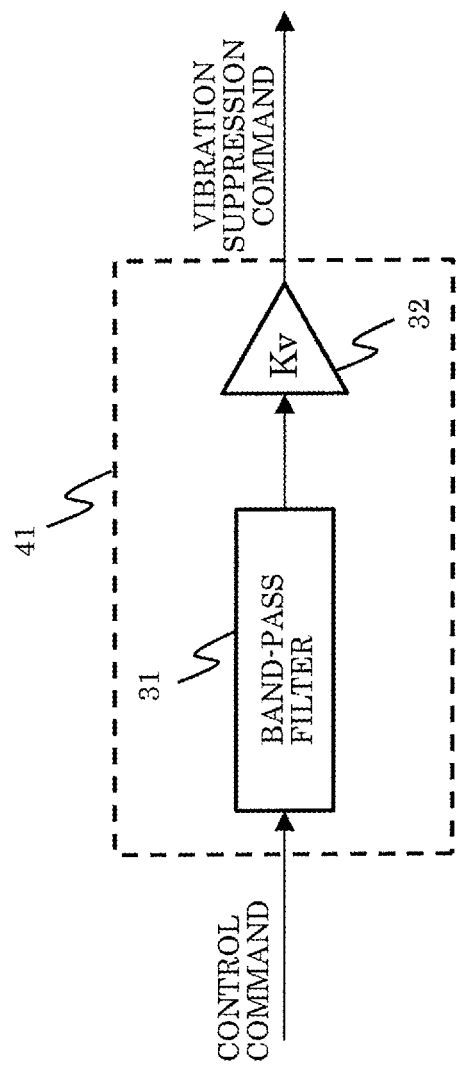
FIG. 14 is a diagram of an exemplary configuration of a first filtering processor according to the embodiment of the present invention.
Figure 15:
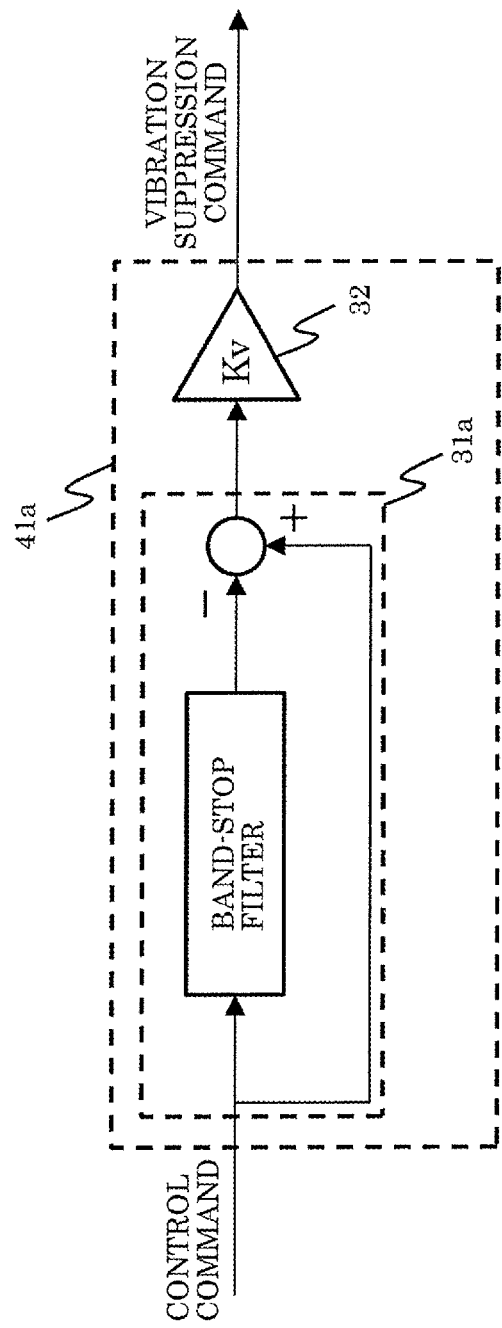
FIG. 15 is a diagram of another exemplary configuration of the first filtering processor according to the embodiment of the present invention.

Since first filtering processor 41 calculates the vibration suppression command based on the control command, the concept in FIG. 9 or FIG. 10 described above may be applied to first filtering processor 41 to have the configuration as illustrated in FIG. 14 or FIG. 15.

Figure 16:
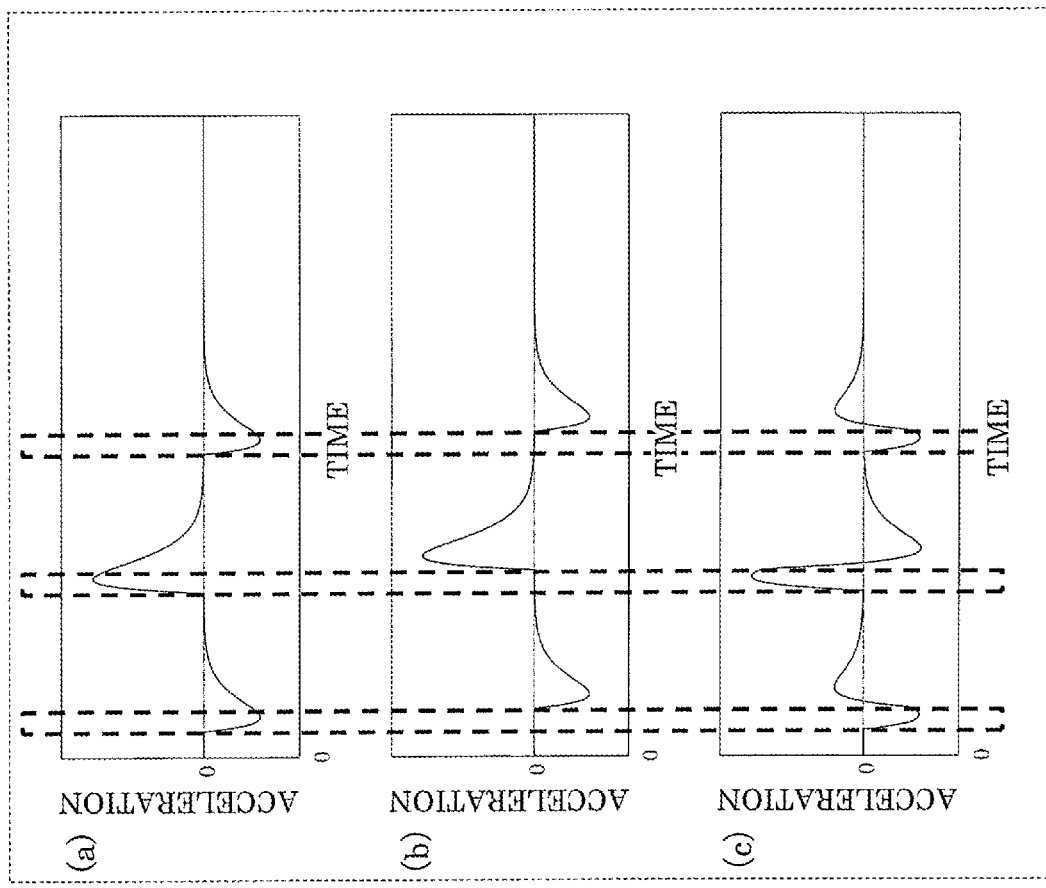
FIG. 16 is a diagram for explaining a method of generating a displacement suppression command from a vibration suppression command in a second filtering processor according to the embodiment of the present invention.

The concept for calculating the displacement suppression command is described with reference to FIG. 16. Control is performed based on a filtered control command obtained by filtering a control command, but the concept will be described by converting the control into the dimensions of acceleration that affect the thrust to make it easy to understand. In FIG. 16, (a) shows an acceleration command for suppressing vibration of the housing, (b) shows a signal obtained by delaying the signal in (a) by dead time, and (c) shows a signal obtained by subtracting (b) from (a). In the areas surrounded by the dashed lines, the jerk is large and an acceleration command is needed to suppress the vibration of the housing. However, there is little change in (a) and (c). Even the acceleration command in (c) is effective to suppress the vibration of the housing. On the other hand, in areas in which the jerk is small, which are areas other than the areas surrounded by the dashed lines, the sign of the acceleration command can be inverted in (c) and the one-sided amplitude of the displacement can be suppressed. However, since the filter that generates the vibration suppression command mainly passes one or more resonance frequency components of the damping device, it is difficult to achieve a desired vibration suppression effect when a signal is delayed by the dead time and simply subtracting the delayed signal from the acceleration command, because the phase of one or more target frequency components is shifted.

Figure 17:
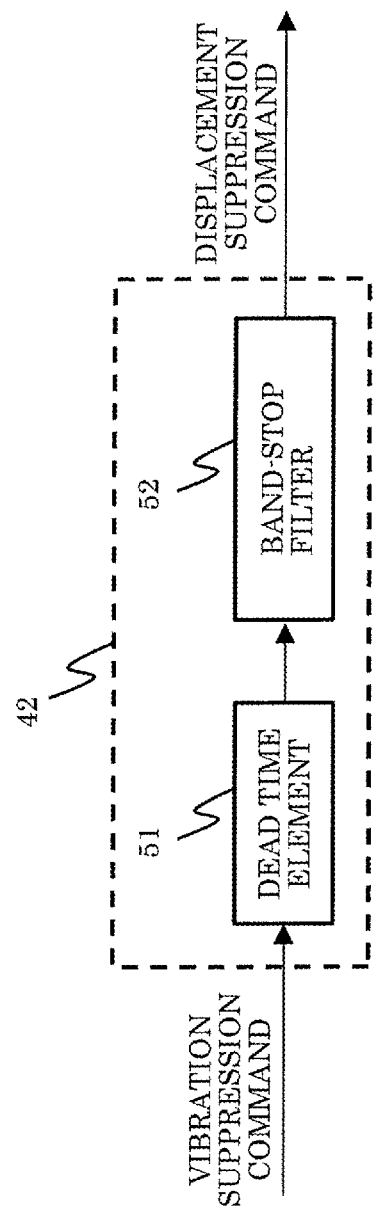
FIG. 17 is a diagram of an exemplary configuration of the second filtering processor according to the embodiment of the present invention.

Therefore, second filtering processor 42 may be configured as illustrated in FIG. 17, for example. Dead time element 51 outputs a delayed vibration suppression command that is a vibration suppression command delayed by the dead time in response to the vibration suppression command. Band-stop filter 52 outputs a displacement suppression command in response to the delayed vibration suppression command by blocking one or more frequency components that need to be blocked to suppress the vibration of the housing. Note that a favorable effect is likely to be achieved when the blocking frequency is the one or more resonance frequencies of the housing.

Figure 18:
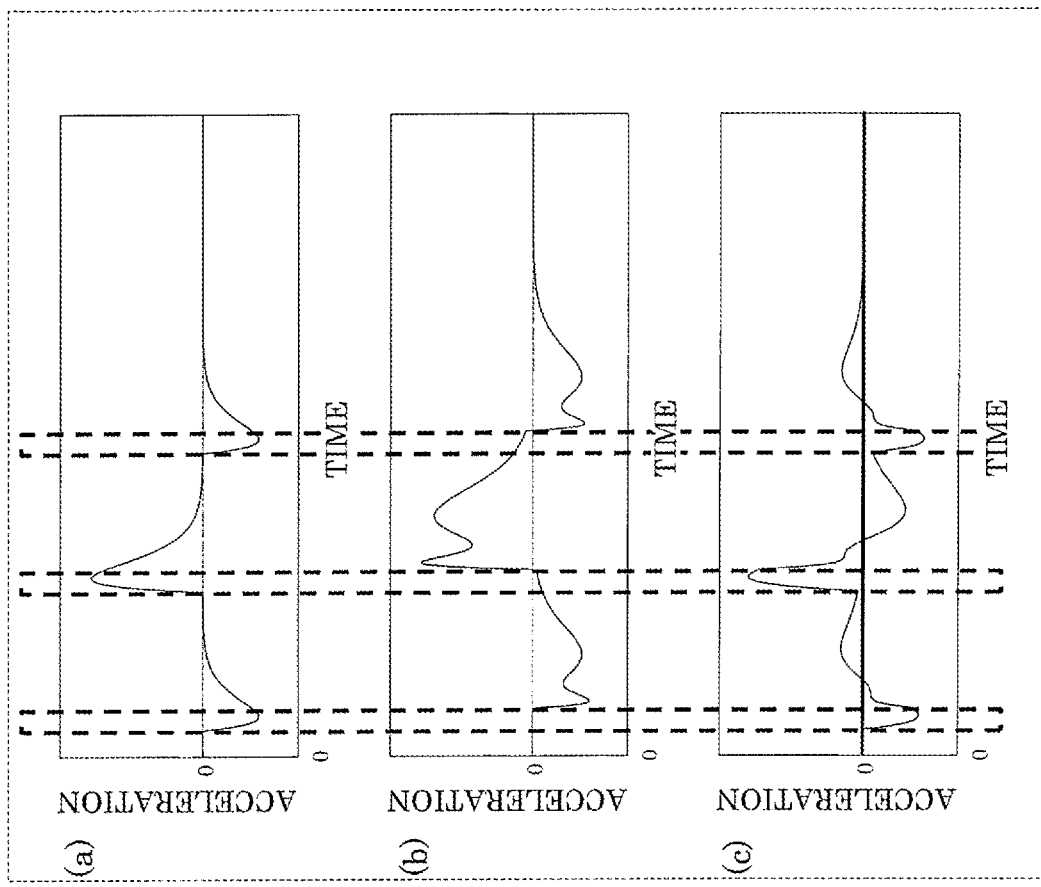
FIG. 18 is a diagram for explaining a method of generating a displacement suppression command from a vibration suppression command in the second filtering processor according to the embodiment of the present invention.

FIG. 18 shows the vibration suppression command, the displacement suppression command, and the filtered control command with the dimensions of acceleration, as in FIG. 16. In FIG. 18, (a) shows the values converted into acceleration of the vibration suppression command, (b) shows the values converted into acceleration of the displacement suppression command, and (c) shows the values converted into acceleration of the filtered control command. In areas in which the jerk is large surrounded by the dashed lines, there is little change in (a) and (c). Even in (c), the vibration suppression of the housing is effective. On the other hand, in areas in which the jerk is small, which are areas other than the areas surrounded by the dashed lines, the sign can be inverted in (c) and the one-sided amplitude of the displacement can be suppressed.

Figure 19:
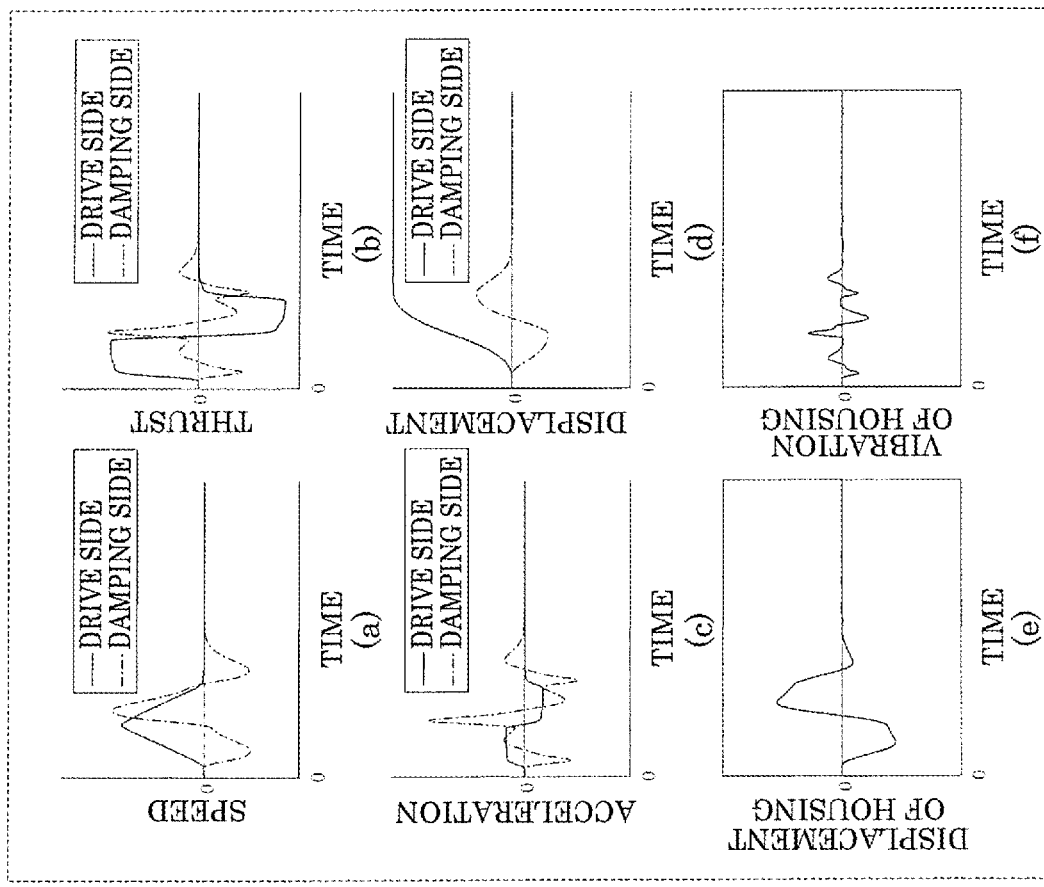
FIG. 19 shows time-series waveforms when a control command is input to the damping device according to the embodiment of the present invention.

FIG. 19 shows time-series waveforms when a control command is input to the damping device according to the embodiment of the present invention. In (a) to (d) in FIG. 19, the solid lines indicate the movements of the drive-side actuator and the dashed lines indicate the movements of the damping-side actuator. In FIG. 19, (a) shows relative speed v1_rel of the drive-side actuator with respect to housing 1 and relative speed v2_rel of the damping-side actuator with respect to housing 1, (b) shows thrust F1 of the drive-side actuator and thrust F2 of the damping-side actuator, (c) shows relative acceleration a1_rel of the drive-side actuator with respect to housing 1 and relative acceleration a1_rel of the damping-side actuator with respect to housing 1, (d) shows relative displacement x1_rel of the drive-side actuator with respect to housing 1 and relative displacement x2_rel of the damping-side actuator with respect to housing 1, (e) shows displacement xb of housing 1, and (f) shows acceleration (vibration) ab of housing 1. Unlike the results shown in FIG. 7, in which vibration of one or more natural frequency components of housing 1 occurs, one or more vibration components are reduced. In addition, unlike the results shown in FIG. 11, which does not take into account the displacement suppression command, the one-sided amplitude of the displacement of the damping-side mover is reduced.

Figure 20:
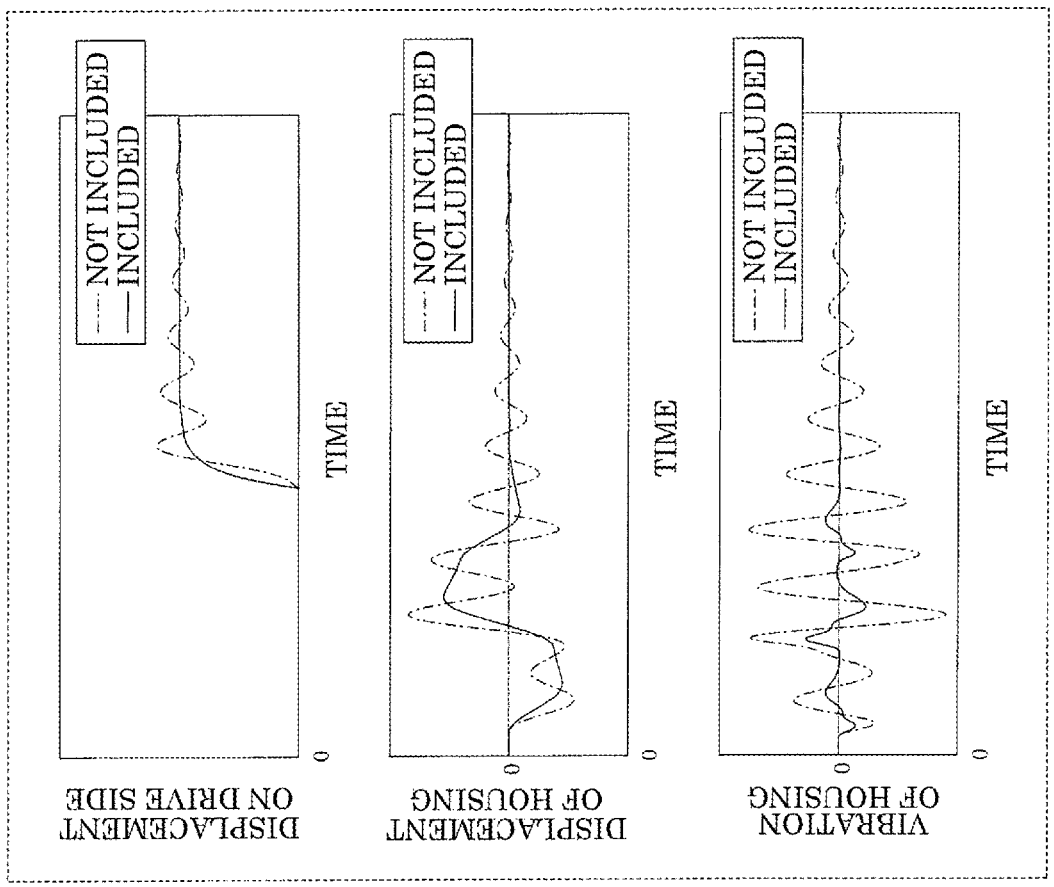
FIG. 20 shows comparisons of time-series waveforms between the conventional device and the damping device according to the embodiment of the present invention when a control command is input to each of the conventional device and the damping device according to the embodiment of the present invention.

FIG. 20 shows comparisons between the time-series waveforms of the conventional device shown in FIG. 7 and the time-series waveforms of the damping device according to the embodiment of the present invention. The dashed lines indicate the waveforms of the conventional device, and the solid lines indicate the waveforms of the damping device according to the embodiment of the present invention. The displacement on the drive side, which has been vibratory in the conventional device, is settled well in the damping device according to the embodiment of the present invention. In addition, the vibration of the housing in which one or more natural frequency components are observed in the conventional device can be reduced by the damping device according to the embodiment of the present invention.

Figure 21:
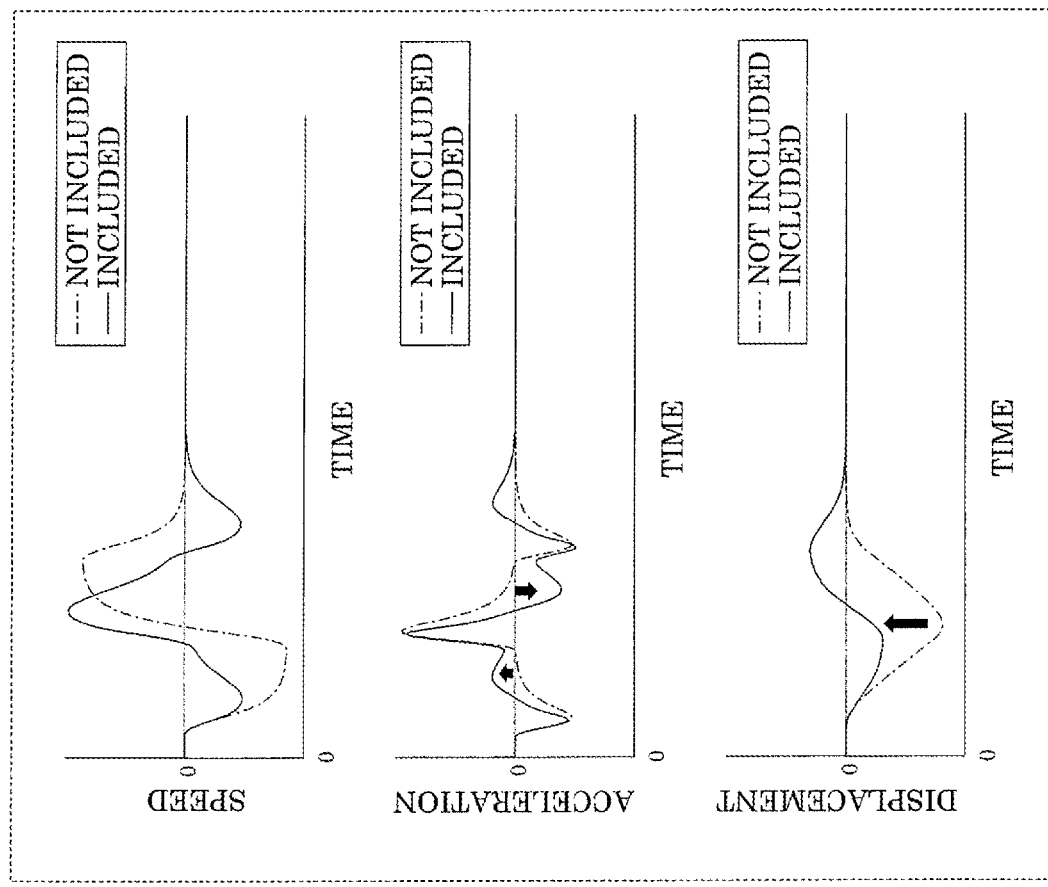
FIG. 21 shows comparisons of time-series waveforms between the conventional device and the damping device according to the embodiment of the present invention when a control command is input to each of the conventional device and the damping device according to the embodiment of the present invention.

FIG. 21 shows comparisons between the time-series waveforms of the device shown in FIG. 11 and the time-series waveforms of the damping device according to the embodiment of the present invention. The dashed lines indicate the waveforms of the device in FIG. 11, and the solid lines indicate the waveforms of the damping device according to the embodiment of the present invention. The device in FIG. 11 has moved in one direction and the one-sided amplitude of the displacement is large. In contrast, the damping device according to the embodiment of the present invention reduces the one-sided amplitude of the displacement by inverting the sign of the acceleration in areas in which the jerk is small.

Figure 22:
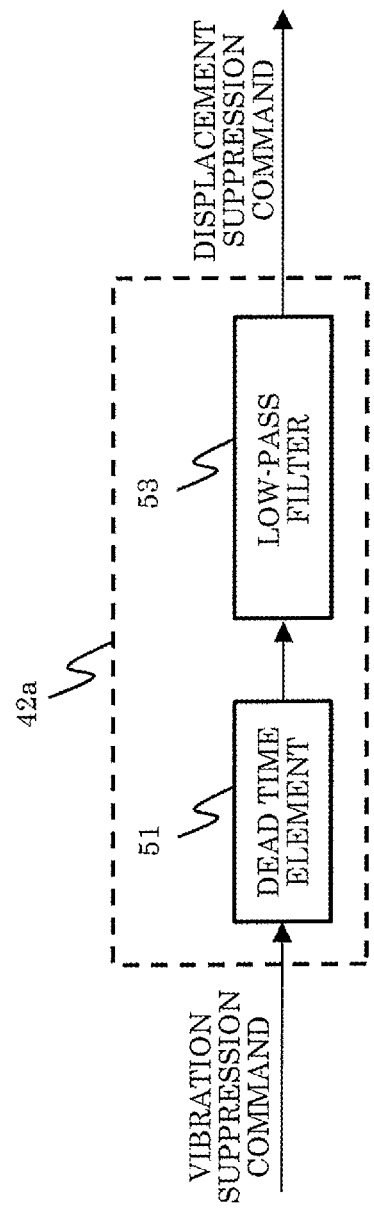
FIG. 22 is a diagram of an exemplary configuration of the second filtering processor according to the embodiment of the present invention.

Moreover, second filtering processor 42a may be configured as illustrated in FIG. 22. In second filtering processor 42a, dead time element 51 outputs a delayed vibration suppression command that is a vibration suppression command delayed by the dead time. Low-pass filter 53 outputs a displacement suppression command by blocking one or more frequency components that need to be blocked to suppress vibration of the housing in response to the delayed vibration suppression command. Note that a favorable effect is likely to be achieved when the cutoff frequency is less than or equal to the one or more resonance frequencies of the housing.

Figure 23:
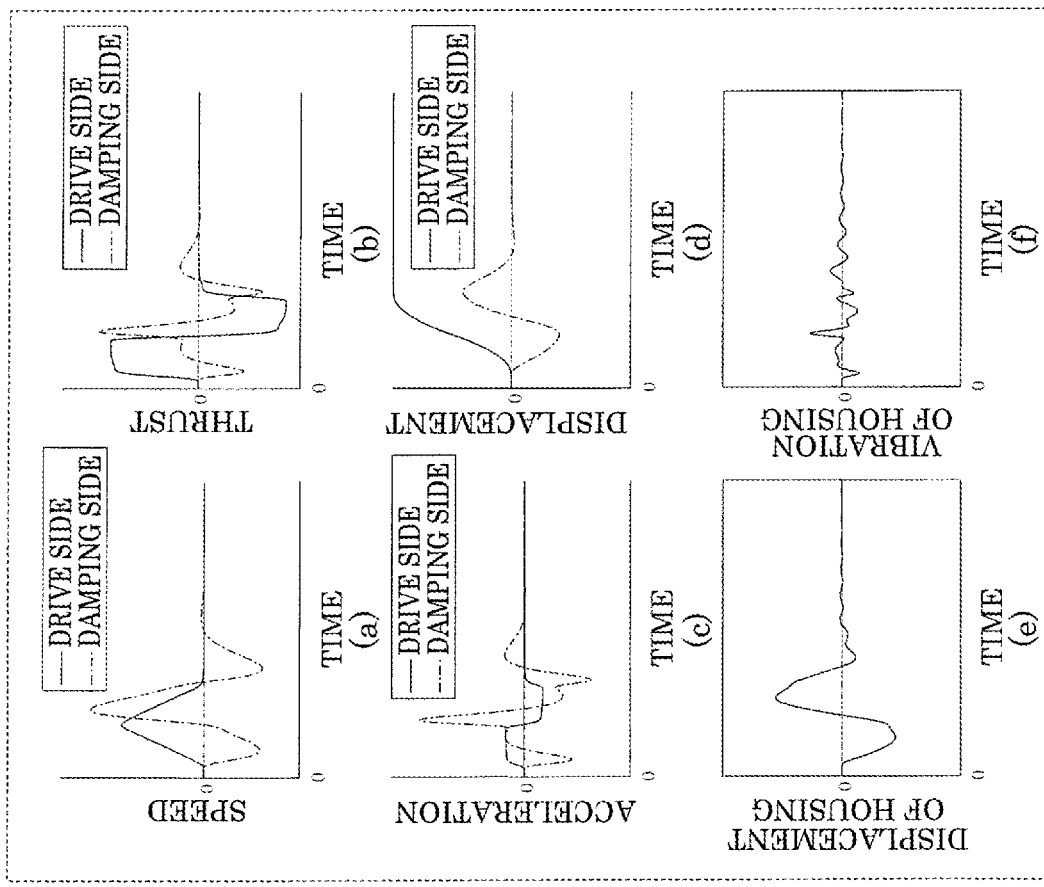
FIG. 23 shows time-series waveforms when a control command is input to the damping device according to the embodiment of the present invention when a low-pass filter is used in the second filtering processor.

FIG. 23 shows time-series waveforms when a control command is input to the damping device according to the embodiment of the present invention in which second filtering processor 42a is applied. Unlike the results shown in FIG. 7, in which vibration of one or more natural frequency components of housing 1 occur, one or more vibration components are reduced. In addition, unlike the results shown in FIG. 11, which does not take into account the displacement suppression command, the one-sided amplitude of the displacement of the damping-side mover is reduced.

Moreover, second filtering processor 42b may be configured as illustrated in FIG. 22. In second filtering processor 42b, dead time element 51 outputs a delayed vibration suppression command that is a vibration suppression command delayed by the dead time. Moving average process 54 outputs a displacement suppression command by blocking one or more frequency components that need to be blocked to suppress vibration of the housing in response to the delayed vibration suppression command. Note that a favorable effect is likely to be achieved when the cutoff frequency is less than or equal to the one or more resonance frequencies of the housing.

Figure 24:
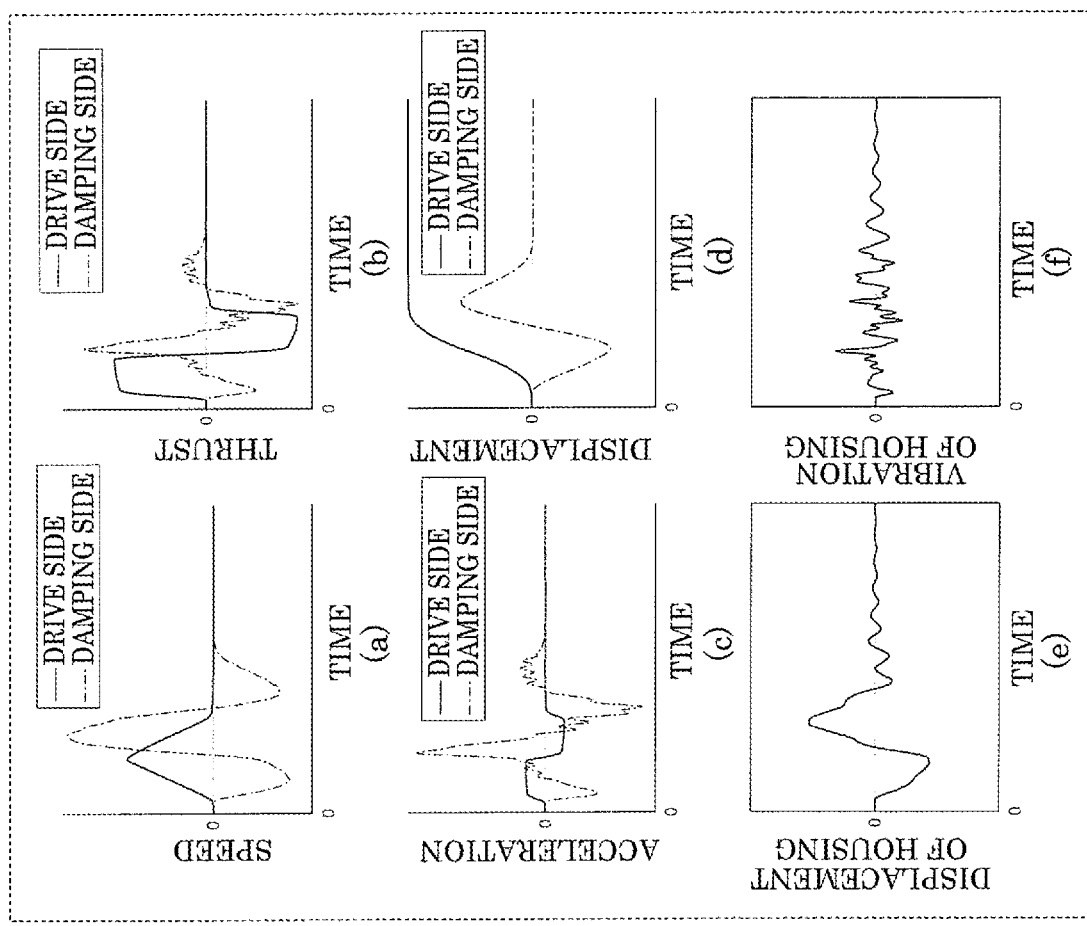
FIG. 24 shows time-series waveforms when a control command is input to the damping device according to the embodiment of the present invention when a moving average process is applied to the second filtering processor.

FIG. 24 shows time-series waveforms when a control command is input to the damping device according to the embodiment of the present invention in which second filtering processor 42b is applied. Unlike the results shown in FIG. 7, in which vibration of one or more natural frequency components of housing 1 occur, one or more vibration components are reduced. In addition, unlike the results shown in FIG. 11, which does not take into account the displacement suppression command, the one-sided amplitude of the displacement of the damping-side mover is reduced.

Note that although drive-side actuator 4 and damping-side actuator 7 are described as linear motion systems in the above embodiment, the present invention may be applied to a rotating system. FIG. 13 is a block diagram of a configuration when FIG. 8 is changed into a rotating system. T1 represents output torque of drive-side actuator 4, T2 represents output torque of damping-side actuator 7, J1 represents inertia of the drive-side mover, J2 represents inertia of the damping-side mover, Jb represents inertia of housing 1, Kb represents the stiffness of housing 1, and Db represents the viscosity of housing 1. By changing the above-described F1 to T1, F2 to T2, M1 to J1, M2 to J2, and Mb to Jb, the vibration of the housing in which one or more natural frequency components are observed in the conventional device can be reduced by the damping device according to the embodiment of the present invention.

Moreover, the present embodiment has a configuration in which the displacement suppression command to suppress the one-sided amplitude of the displacement of the damping-side mover in which the jerk is small is calculated using a filtering member, etc. However, for example, the present invention may have a configuration in which a displacement suppression command having a fixed value that enables inverting of the sign of acceleration is subtracted from the vibration suppression command, only when a state in which the jerk is large is changed to a state in which the jerk is small and only for a predetermined time from when the change in jerk occurs. Such a configuration makes it possible to achieve both of reduction of the vibration of the housing and reduction of the one-sided amplitude of the displacement of the damping-side mover without filtering calculation and with less calculation load.

INDUSTRIAL APPLICABILITY

As described above, the damping device according to the present invention reduces or offsets, by the thrust produced when the damping-side actuator moves, one or more natural frequency components of the housing produced by the reaction force acting on the housing by thrust produced when the drive-side actuator moves. Therefore, the drive-side mover can be moved at high speed and is applicable to devices that are desired to produce many products in a short time, such as semiconductor manufacturing devices, mounting devices, machine tools, and conveying devices.

REFERENCE MARKS IN THE DRAWINGS 1 housing
2 drive-side stator
3 drive-side mover
4 drive-side actuator
5 damping-side stator
6 damping-side mover
7 damping-side actuator
8 first signal calculator
9 second signal calculator
21 first speed control calculator
22 first thrust control calculator
23 filtering processor
24 second speed control calculator
25 second thrust control calculator
31 band-pass filter
32 gain
41 first filtering processor
42, 42a, 42b second filtering processor
43 add-subtract processor
51 dead time element
52 band-stop filter
53 low-pass filter
54 moving average process

The invention claimed is:

1. A damping device, comprising:
a housing;
a drive-side actuator that includes a drive-side stator and a drive-side mover and is connected to the housing;
a damping-side actuator that includes a damping-side stator and a damping-side mover and is connected to the housing;
a first signal calculator that generates a drive signal for the drive-side actuator based on a control command; and
a second signal calculator that generates, when the drive-side actuator changes from a state in which jerk is large to a state in which the jerk is small, a drive signal for the damping-side actuator based on a signal obtained by subtracting a displacement suppression command from a vibration suppression command, the displacement suppression command being a command to suppress a displacement of the damping-side mover, the vibration suppression command being a command to reduce or offset, by a vibration component of the housing produced by driving of the damping-side actuator, a natural frequency component of the housing produced by driving of the drive-side actuator based on the control command, wherein
the first signal calculator calculates a driver control command for generating the drive signal for the drive-side actuator based on the control command, and
the second signal calculator:
includes a filtering processor that includes a first filtering processor and a second filtering processor that are based on a mechanical constant of the damping device;
calculates the vibration suppression command by passing the control command or the driver control command through the first filtering processor;
calculates the displacement suppression command by passing the vibration suppression command through the second filtering processor; and
calculates a damper control command for generating the drive signal for the damping-side actuator based on the signal obtained by subtracting the displacement suppression command from the vibration suppression command.

2. The damping device according to claim 1, wherein a mass of the damping-side mover is less than or equal to a mass of the drive-side mover.

3. The damping device according to claim 1, wherein the control command is a position command or a speed command.

4. The damping device according to claim 1, wherein the second filtering processor includes at least one dead time element.

5. The damping device according to claim 1, wherein the first filtering processor includes at least one band-pass filter.

6. The damping device according to claim 5, wherein a passing frequency of the band-pass filter in the first filtering processor is a resonance frequency of the housing.

7. The damping device according to claim 1, wherein the second filtering processor includes at least one band-stop filter.

8. The damping device according to claim 7, wherein a blocking frequency of the band-stop filter in the second filtering processor is a resonance frequency of the housing.

9. The damping device according to claim 1, wherein the second filtering processor includes at least one low-pass filter.

10. The damping device according to claim 9, wherein a cutoff frequency of the low-pass filter in the second filtering processor is less than or equal to a resonance frequency of the housing.

11. The damping device according to claim 1, wherein the second filtering processor includes at least one moving average process.

12. The damping device according to claim 11, wherein a cutoff frequency of the moving average process in the second filtering processor is less than or equal to a resonance frequency of the housing.

13. The damping device according to claim 1, wherein the filtering processor applies a gain Kv that is less than or equal to a mass ratio obtained by dividing a mass of the drive-side mover by a mass of the damping-side mover.

* * * * *